(12) United States Patent
Sakazume

(10) Patent No.: US 10,554,978 B2
(45) Date of Patent: Feb. 4, 2020

(54) IMAGE TRANSMISSION DEVICE AND IMAGE TRANSMISSION CONTROL DEVICE

(71) Applicant: JVC KENWOOD Corporation, Yokohama-shi, Kangawa (JP)

(72) Inventor: Satoru Sakazume, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 327 days.

(21) Appl. No.: 15/605,229

(22) Filed: May 25, 2017

(65) Prior Publication Data

US 2017/0264903 A1 Sep. 14, 2017

Related U.S. Application Data

(63) Continuation of application No. PCT/JP2015/073479, filed on Aug. 21, 2015.

(30) Foreign Application Priority Data

Dec. 1, 2014 (JP) .................................. 2014-242867
Dec. 1, 2014 (JP) .................................. 2014-242870

(51) Int. Cl.
*H04N 19/152* (2014.01)
*H04N 19/166* (2014.01)
(Continued)

(52) U.S. Cl.
CPC ......... *H04N 19/152* (2014.11); *H04N 19/166* (2014.11); *H04W 24/04* (2013.01); *H04W 28/06* (2013.01)

(58) Field of Classification Search
CPC ............... H04N 19/152; H04N 19/166; H04N 21/2146; H04N 21/2402; H04N 21/2404;
(Continued)

(56) References Cited

U.S. PATENT DOCUMENTS

2010/0002080 A1* 1/2010 Maki .................... G07C 5/0891
348/148
2010/0290522 A1* 11/2010 Otani .................... H04L 1/0014
375/240.02
(Continued)

FOREIGN PATENT DOCUMENTS

JP 2007252005 A 9/2007
JP 2008011077 A 1/2008
(Continued)

*Primary Examiner* — Tung T Vo
(74) *Attorney, Agent, or Firm* — Nath, Goldberg & Meyer; Jerald L. Meyer; Stanley N. Protigal

(57) ABSTRACT

An encoder encodes moving image data and generates encoded moving image data. A transmission buffer accumulates the encoded moving image data. A transmission/reception unit transmits the encoded moving image data to an image reception device via a wireless communication line. A failure detector predicts whether or not the failure of a real-time transmission of the encoded moving image data occurs, and detects the time until the failure occurs. When the failure is predicted to occur, an encoding controller controls the encoder to decrease, within the detected time, the target bit rate when the encoder encodes the moving image data.

6 Claims, 11 Drawing Sheets

(51) Int. Cl.
*H04W 24/04* (2009.01)
*H04W 28/06* (2009.01)

(58) Field of Classification Search
CPC ..... H04N 21/2662; H04L 47/25; H04L 47/38; H04W 64/00; H04W 24/04; H04W 28/06; H04W 28/0226
USPC .................................................. 375/240.02
See application file for complete search history.

(56) References Cited

U.S. PATENT DOCUMENTS

| 2011/0033168 A1* | 2/2011 | Iyer ...................... H04N 7/173 386/241 |
| 2015/0188966 A1* | 7/2015 | Eyler ................... H04L 65/602 709/231 |
| 2016/0173805 A1* | 6/2016 | Claus .................. H04N 17/004 348/148 |

FOREIGN PATENT DOCUMENTS

| JP | 2008283700 A | 11/2008 |
| JP | 2009081753 A | 4/2009 |
| JP | 2009225011 A | 10/2009 |
| WO | 2013031114 A1 | 3/2013 |
| WO | 2013057763 A1 | 4/2013 |

* cited by examiner

IMAGE TRANSMISSION DEVICE AND IMAGE TRANSMISSION CONTROL DEVICE

CROSS REFERENCE TO RELATED APPLICATION

This application is a Continuation of PCT Application No. PCT/JP2015/073479, filed on Aug. 21, 2015, and claims the priority of Japanese Patent Application No. 2014-242867, filed on Dec. 1, 2014, and No. 2014-242870, filed on Dec. 1, 2014, the entire contents of all of which are incorporated herein by reference.

BACKGROUND

The present disclosure relates to an image transmission device that transmits moving image data to an image reception device via a wireless communication line and to an image transmission control device that controls the image transmission device.

In recent years, moving image data has been frequently transmitted and received via a wireless communication line as the transmission band of the wireless communication line has been widened, and as image compression technology capable of greatly reducing the data capacity of image data has been developed.

SUMMARY

However, in a state in which radio field intensity is weak, the transmission rate in a case of transmitting the image data is decreased. Then, encoded moving image data cannot be transmitted in real time from an image transmission device to an image reception device, and the image reception device cannot receive the encoded moving image data which is necessary to reproduce a moving image in some cases.

When the image transmission device is provided in a mobile body such as a vehicle, then in some cases, the radio field intensity is varied according to the place where the mobile body travels. Hence, it is a problem that the real-time transmission of the encoded moving image data is prone to fail.

A first aspect of the embodiments provides an image transmission device including: an encoder configured to encode moving image data and generate encoded moving image data; a transmission buffer configured to accumulate the encoded moving image data; a transmitter configured to transmit the encoded moving image data, which is accumulated in the transmission buffer, to an image reception device via a wireless communication line; a failure detector configured, based on position information, speed information, and direction information of a mobile body, on radio field intensity distribution information of the wireless communication line at least in a route along which the mobile body moves, on an encoding bit rate in the encoder, and on state information indicating an accumulation state of the encoded moving image data in the transmission buffer, to predict whether or not a failure of real-time transmission occurs, the failure being a state in which the encoded moving image data is not transmitted from the transmitter to the image reception device in real time, and to detect a time until the failure occurs; and an encoding controller configured, when the failure detector predicts that the failure occurs, to control the encoder to decrease, within the time, a target bit rate when the encoder encodes the moving image data.

A second aspect of the embodiments provides an image transmission control device including: a failure detector configured, based on position information, speed information, and direction information of a mobile body, on radio field intensity distribution information of a wireless communication line at least in a route along which the mobile body moves, on an encoding bit rate when an encoder in the image transmission device encodes moving image data and generates encoded moving image data, and on state information indicating an accumulation state of the encoded moving image data in a transmission buffer that accumulates the encoded moving image data, to predict whether or not a failure of real-time transmission occurs, the failure being a state in which the encoded moving image data is not transmitted to an image reception device in real time, and to detect a time until the failure occurs; and an encoding control signal generator configured, when the failure detector predicts that the failure occurs, to generate an encoding control signal for decreasing, within the time, a target bit rate when the encoder encodes the moving image data, and to transmit the generated encoding control signal to the image transmission device.

DETAILED DESCRIPTION

Hereinafter, a description will be made of an image transmission device and an image transmission control device according to the embodiments with reference to the accompanying drawings.

First Embodiment

Figure 1:
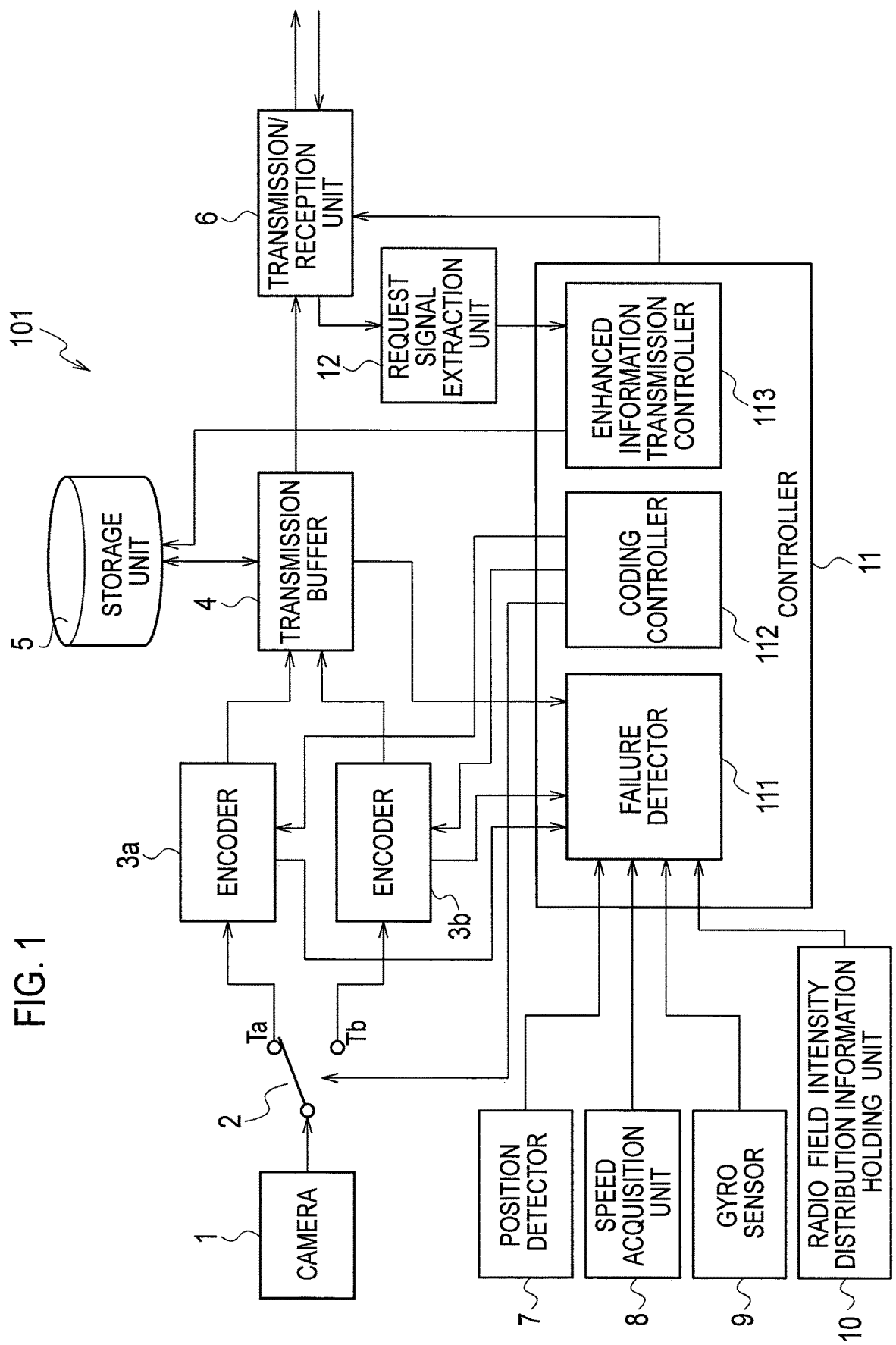
FIG. 1 is a block diagram showing an image transmission device that composes a transmission/reception system according to the first embodiment.
Figure 2:
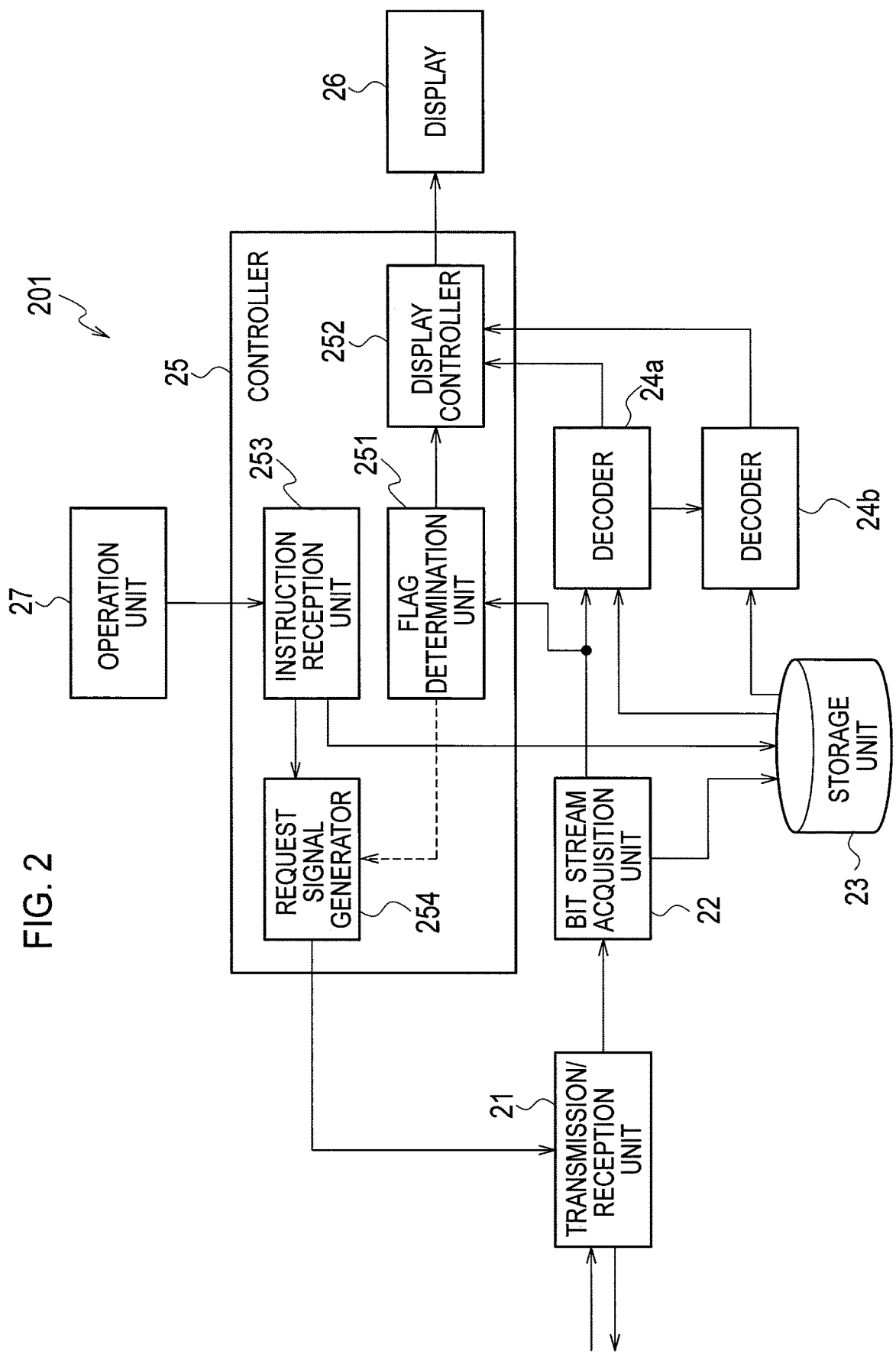
FIG. 2 is a block diagram showing an image reception device that composes the transmission/reception system according to the first embodiment.

An image transmission device 101 shown in FIG. 1 and an image reception device 201 shown in FIG. 2 compose a transmission/reception system according to the first embodiment. The image transmission device 101 is configured as follows, and transmits encoded moving image data (hereinafter, abbreviated as encoded data in some cases) to the image reception device 201. It is assumed that the image transmission device 101 is mounted on a vehicle as an example of a mobile body.

A camera 1 captures an image of a subject, and outputs moving image data. When the camera 1 outputs an analog moving image signal, the analog moving image signal only needs to be converted into digital moving image data by an A/D converter (not shown).

The camera 1 is an example of a moving image data generator. The moving image data generator may be a reproduction device that reproduces moving image data recorded in a recording medium.

The moving image data is inputted to an encoder 3a via a terminal Ta of a switch 2. As will be described later, the moving image data is inputted to an encoder 3b via a terminal Tb of the switch 2. The encoders 3a and 3b encode the moving image data by moving image compression modes different from each other. The encoders 3a and 3b may be composed of encoding circuits.

The moving image compression modes, which the encoders 3a and 3b adopt, may be MPEG-4, H. 264/MPEG-4 AVC/MPEG-4 SVC, H.265/HEVC/SHVC, and the like. In the present embodiment, it is assumed that the compression ratio of the moving image compression mode adopted by the encoder 3b is higher than the compression ratio of the moving picture compression mode adopted by the encoder 3a. The encoders 3a and 3b may adopt Motion JPEG, Motion JPEG 2000, and the like, which do not use a correlation between images which have different times, as the moving image compression mode.

Here, the encoders 3a and 3b may adopt such a moving image compression mode capable of realizing hierarchical encoding. When the encoders 3a and 3b adopt the moving image compression mode capable of realizing the hierarchical encoding, the encoders 3a and 3b generate such encoded moving image data as follows.

That is, when a target bit rate is decreased below a normal transmission rate, the encoders 3a and 3b perform predetermined encoding processing for the moving image data so that the moving image data can remain within the target bit rate, and can generate encoded moving image data as base layers. The encoders 3a and 3b generate enhanced encoded moving image data as an enhanced layer for compensating for a difference between encoding quality of the base layer and encoding quality of the moving image data to be originally transmitted.

In this way, encoded moving image data corresponding to an amount of codes which cannot be transmitted when the target bit rate is decreased can be generated as enhanced encoded moving image data serving as the enhanced layer.

It is preferable that the image transmission device 101 includes a plurality of encoders which encode the moving image data by different moving image compression modes; however, there may be adopted such a configuration including a plurality of encoders which encode the moving image data by one moving image compression mode, and a configuration including one encoder that encodes the moving image data by one moving image compression mode.

Encoded data outputted from the encoder 3a (or 3b) is inputted to a transmission buffer 4, and is temporarily accumulated therein. A transmission signal of a bit stream including the encoded data accumulated in the transmission buffer 4 is transmitted to the image reception device 201 via a wireless communication line by the transmission/reception unit 6. Moreover, the encoded data accumulated in the transmission buffer 4 is inputted to and stored in a storage unit 5.

Here, it is recommended that the transmission buffer 4 be composed of a storage unit such as predetermined memory and HDD (hard disk drive). The transmission/reception unit 6 includes a transmitter (a transmission circuit) and a receiver (a reception circuit). Moreover, it is recommended that the storage unit 5 be composed of a storage unit such as predetermined memory and HDD.

It is recommended that enhanced encoded data of the enhanced layer as a part of the encoded data be stored in the storage unit 5 via the transmission buffer 4, and may be accumulated in the transmission buffer 4 as needed. Moreover, the enhanced encoded data of the enhanced layer may be configured to be directly supplied from the encoder 3a (or 3b) to the storage unit 5.

The image transmission device 101 may transmit and receive signals or data to and from the image reception device 201 by a half duplex communication mode, or may transmit and receive signals or data by a full duplex communication mode.

As will be described later, in some cases the image reception device 201 transmits a predetermined signal to the image transmission device 101. When the half duplex communication mode is adopted, the image reception device 201 needs only to transmit the predetermined signal to the image transmission device 101 at a timing when the image transmission device 101 does not transmit the encoded data to the image reception device 201.

For example, a position detector 7 receives radio waves from a satellite for the Global Navigation Satellite System (GNSS), and detects position information of the vehicle (the image transmission device 101). The GNSS is a GPS (Global Positioning System) as an example. The position information detected by the position detector 7 is inputted to a failure detector 111 in a controller 11.

Such a configuration may be adopted so that when the vehicle mounts such a navigation device thereon and the navigation device detects the position information of the vehicle, then the position information detected by the navigation device can be supplied to the failure detector 111. The position detector 7 may be provided in the controller 11.

A speed acquisition unit 8 acquires traveling speed information of the vehicle by a predetermined method. The speed acquisition unit 8 may acquire the traveling speed information based on a vehicle speed pulse generated by the vehicle. The speed acquisition unit 8 may acquire the traveling speed information based on a variation of the position information detected per unit time, which is detected by the position detector 7. The traveling speed information acquired by the speed acquisition unit 8 is inputted to the failure detector 111.

A gyro sensor 9 detects direction information when the vehicle travels. The direction information detected by the gyro sensor 9 is inputted to the failure detector 111. Such a configuration may be adopted so that when the navigation device includes the gyro sensor, the direction information outputted from the gyro sensor of the navigation device can be supplied to the failure detector 111.

A radio field intensity distribution information holding unit 10 holds radio field intensity distribution information of the wireless communication line. The radio field intensity distribution information holding unit 10 previously holds radio field intensity distribution information including at least an area within a range where the vehicle moves. The radio field intensity distribution information holding unit 10 can be composed of a predetermined memory. Alternatively, the radio field intensity distribution information holding unit 10 may acquire necessary radio field intensity distribution information from the radio field intensity distribution information held in an external server (a cloud), for example.

Figure 3:
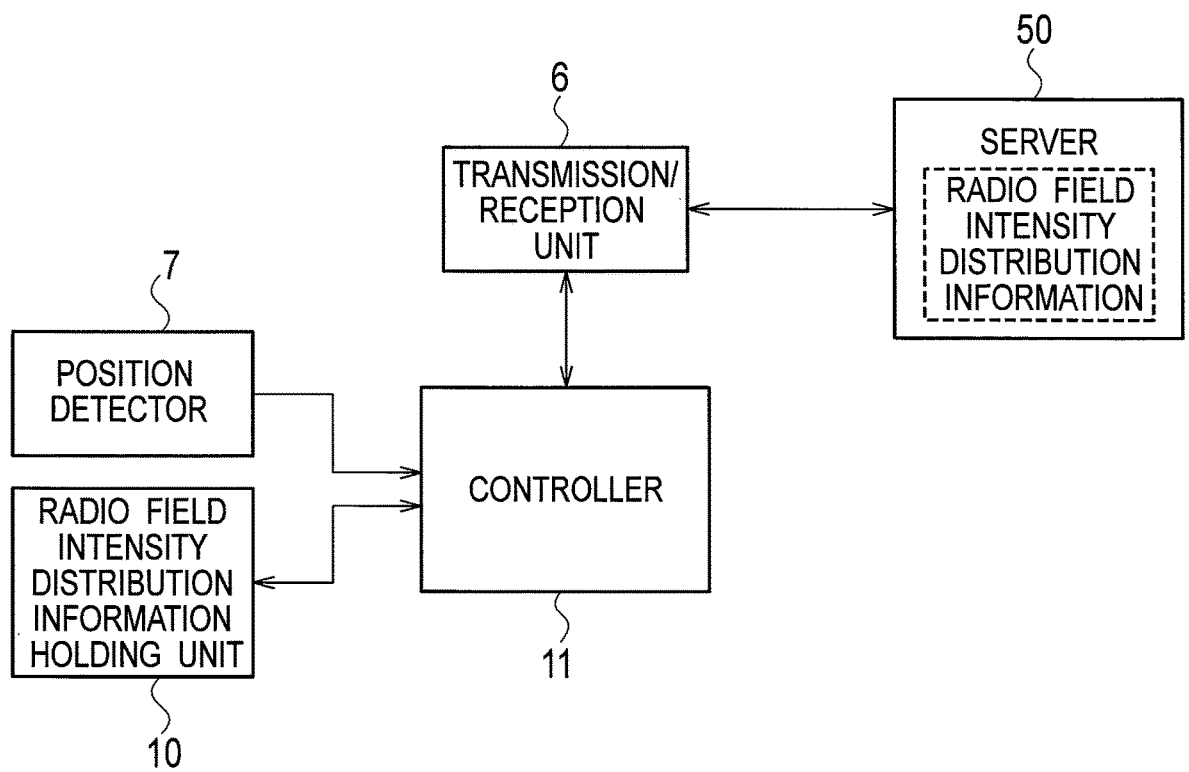
FIG. 3 is a block diagram showing a configuration example when the image transmission device acquires radio field intensity distribution information from a server.

In a latter case, the image transmission device 101 only needs to be configured as shown in FIG. 3. As shown in FIG. 3, a server 50 holds the radio field intensity distribution information. Based on control of the controller 11, the transmission/reception unit 6 requests the server 50 to transmit the radio field intensity distribution information, and receives the radio field intensity distribution information. The controller 11 causes the radio field intensity distribution information holding unit 10 to hold the received radio field intensity distribution information.

At this time, the controller 11 may refer to the position information of the vehicle which is detected by the position detector 7, and may control the radio field intensity distribution information holding unit 10 to acquire radio field intensity distribution information of an area within a predetermined range, including a point where the vehicle is located.

Such holding of the radio field intensity distribution information by the radio field intensity distribution information holding unit 10 includes not only continuous holding of the radio field intensity distribution information, but also temporary holding of the radio field intensity distribution information acquired from the server 50.

Note that the radio field intensity distribution information is generated based on data measured by a provider of the transmission/reception system or a third party.

Figure 4:
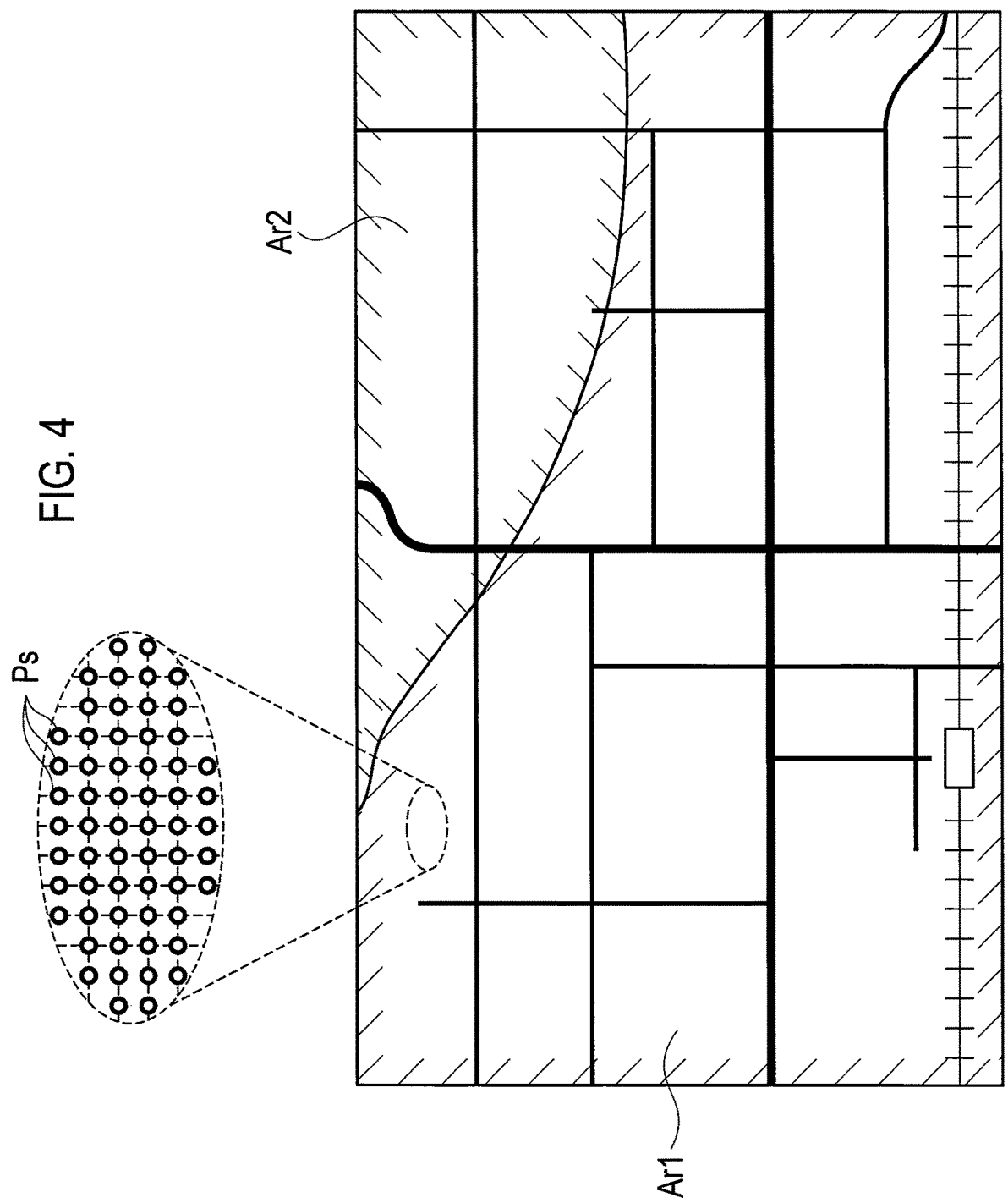
FIG. 4 is a view conceptually showing an example of the radio field intensity distribution information.

FIG. 4 conceptually shows the radio field intensity distribution information held by the radio field intensity distribution information holding unit 10. In an area shown in FIG. 4, an area Ar1 indicates an area where the radio field intensity is relatively strong, and an area Ar2 indicates an area where the radio field intensity is relatively weak. The radio field intensity distribution information can be composed of data indicating radio field intensities of a plurality of points Ps obtained by partitioning the area into a mesh shape, for example.

Figure 5:
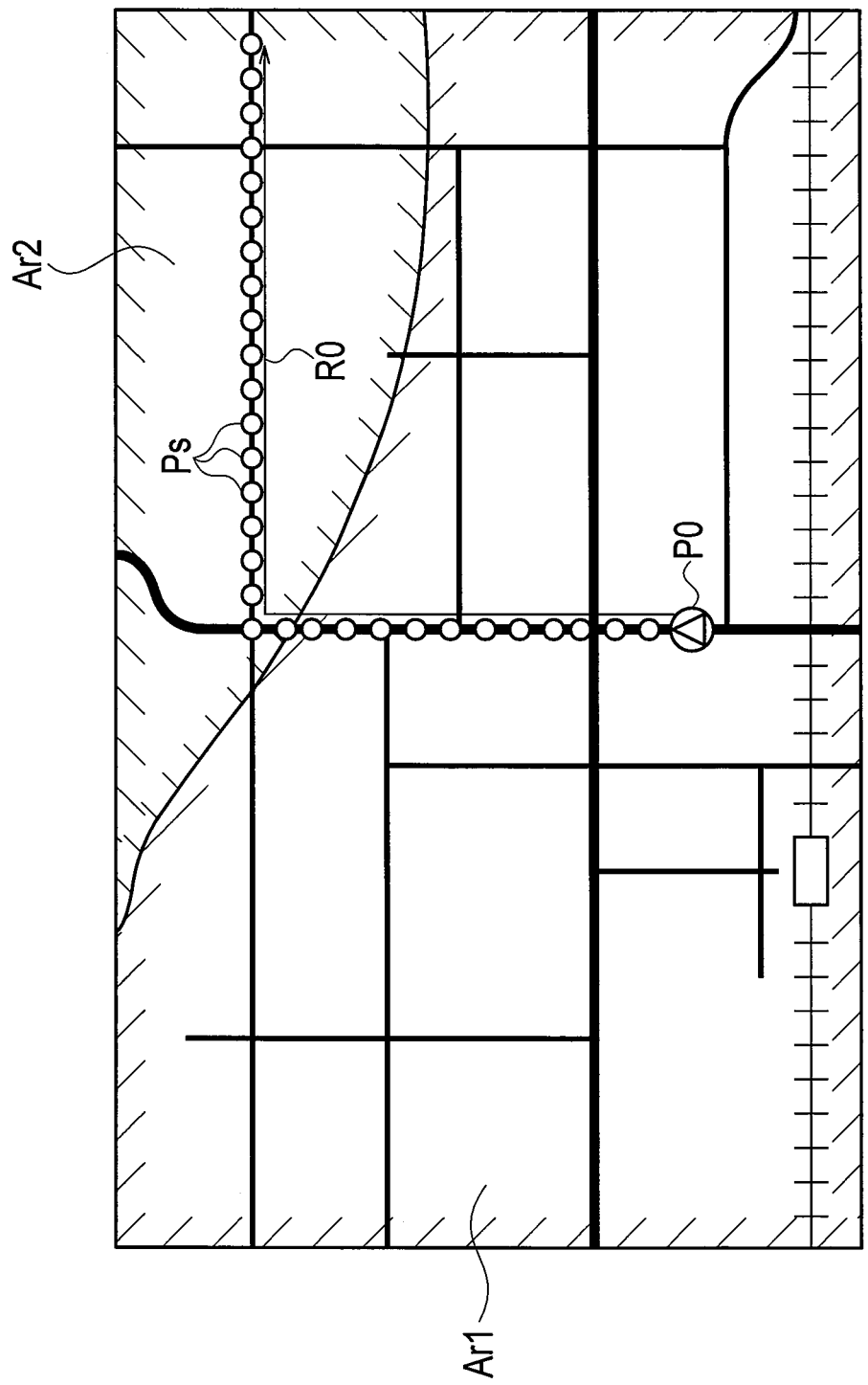
FIG. 5 is a view conceptually showing another example of the radio field intensity distribution information.

It is assumed that, as shown in FIG. 5, the vehicle is located at the current position P0, and is decided to travel on a road indicated by a travel route R0. In such a case, the radio field intensity distribution information holding unit 10 may simply hold data indicating radio field intensities of a plurality of points Ps on the travel route R0.

The controller 11 may acquire information of the travel route R0 of the vehicle from the navigation device, and may acquire the radio field intensities of a plurality of points Ps on the travel route R0 from the server 50, and may cause the radio field intensity distribution information holding unit 10 to hold the acquired radio field intensities.

When plural pieces of travel route information can be acquired from the navigation device, then the controller 11 may acquire such radio field intensities of a plurality of points Ps on a plurality of travel routes from the server 50, and may cause the radio field intensity distribution information holding unit 10 to hold the acquired radio field intensities.

Here, when the storage capacity of the radio field intensity distribution information holding unit 10 is not sufficient, the controller 11 may acquire information of the travel routes in a descending order of priority thereof from the navigation device, and may cause the radio field intensity distribution information holding unit 10 to hold the radio field intensities in order from those of a plurality of points Ps on the travel route with higher priority. The controller 11 may cause the radio field intensity distribution information holding unit 10 to not hold the radio field intensities of a plurality of points Ps on the travel route with low priority.

Returning to FIG. 1, the controller 11 includes the failure detector 111, an encoding controller 112, and an enhanced information transmission controller 113. A request signal extraction unit 12 is connected to the enhanced information transmission controller 113. Operations of the request signal extraction unit 12 and the enhanced information transmission controller 113 will be described together with the operations of the image reception device 201.

Here, it is recommended that the controller 11 be composed of a predetermined memory and processor. Moreover, in a similar way, each of the failure detector 111, the encoding controller 112, and the enhanced information transmission controller 113 may be composed of a predetermined memory and processor, or may be configured to share the memory of the controller 11, and to control the respective units by the processor of the controller 11.

The encoding controller 112 instructs the encoder 3a on a target bit rate when the encoder 3a encodes the moving image data. To the failure detector 111, information is inputted that indicates an encoding bit rate that is a code amount generated when the encoder 3a actually encodes the moving image data.

When the encoder 3b operates in place of the encoder 3a, then in a similar way to the above, the encoding controller 112 instructs the encoder 3b on a target bit rate when the encoder 3b encodes the moving image data. To the failure detector 111, information is inputted that indicates an encoding bit rate that is a code amount generated when the encoder 3b actually encodes the moving image data.

Moreover, to the failure detector 111, state information is inputted that indicates an accumulation state of the encoded data in the transmission buffer 4. For example, the accumulation state of the transmission buffer 4 can be defined as an extent of margin, that is a capacity that enables further accumulation of the encoded data at a certain point of time.

If the radio field intensity is weak when the image transmission device 101 transmits the encoded data to the image reception device 201, then such a situation is brought about where the encoded data accumulated in the transmission buffer 4 is not sufficiently transmitted to the image reception device 201. Then, the margin for accumulating the encoded data in the transmission buffer 4 is lost, and real-time transmission of the encoded data fails.

Accordingly, the failure detector 111 predicts whether or not such a failure of the real-time transmission occurs based on the position information, traveling speed information, and direction information of the vehicle, based on the radio field intensity distribution information, based on the encoding bit rate of the encoder 3a (or 3b), and based on the state information of the transmission buffer 4. When the failure detector 111 predicts that the failure of the real-time transmission fails, the failure detector 111 detects a time until the failure occurs.

Figure 6:
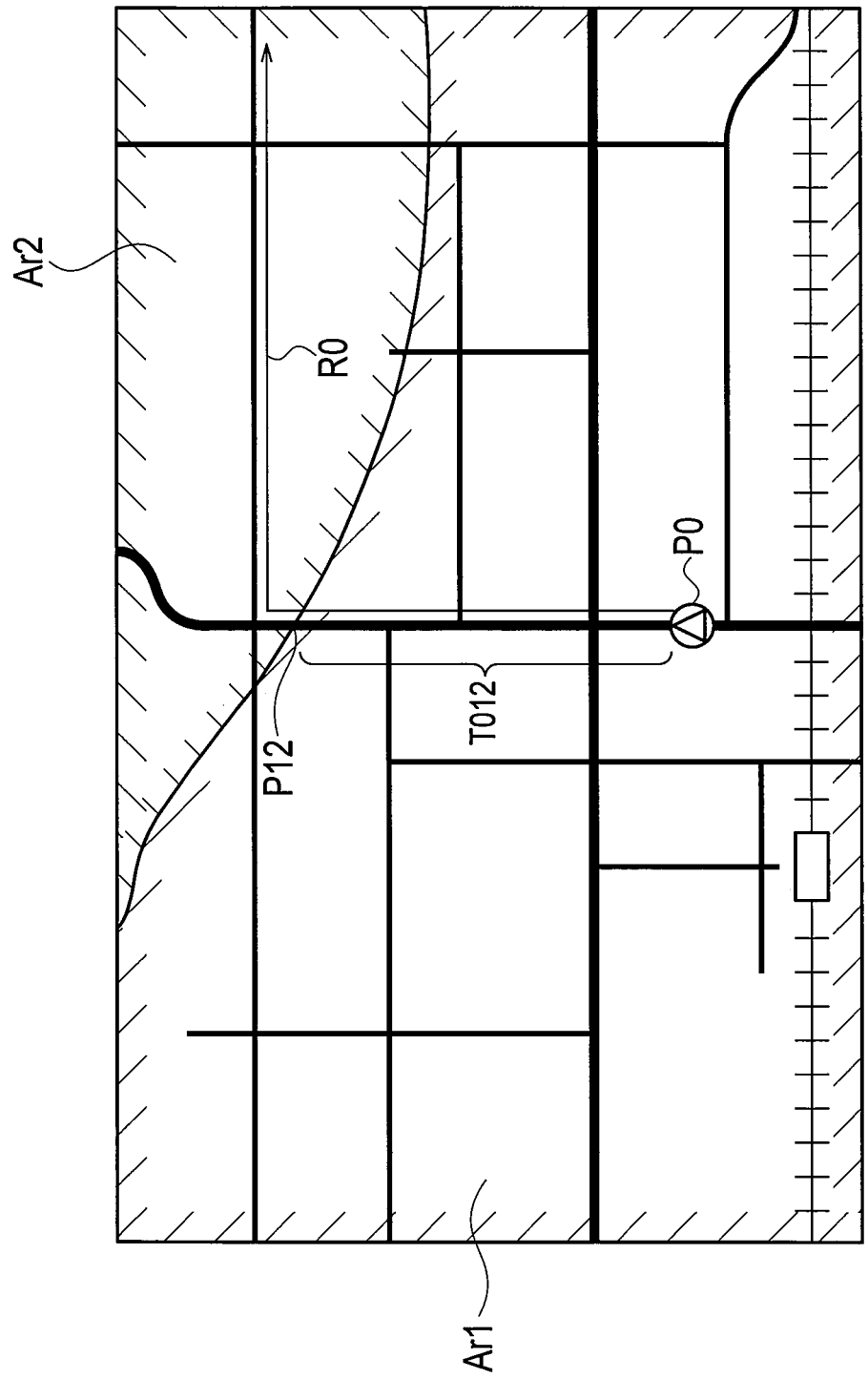
FIG. 6 is a view showing an example when a failure of real-time transmission of encoded moving image data occurs.

As shown in FIG. 6, when the vehicle is located at the current position P0 and travels on the travel route R0, then the failure detector 111 can detect when the vehicle reaches a boundary point P12 between the areas Ar1 and Ar2, based on the above-described respective pieces of information. The failure detector 111 detects a time T012 until the vehicle reaches the boundary point P12 from the current position P0.

Figure 7:
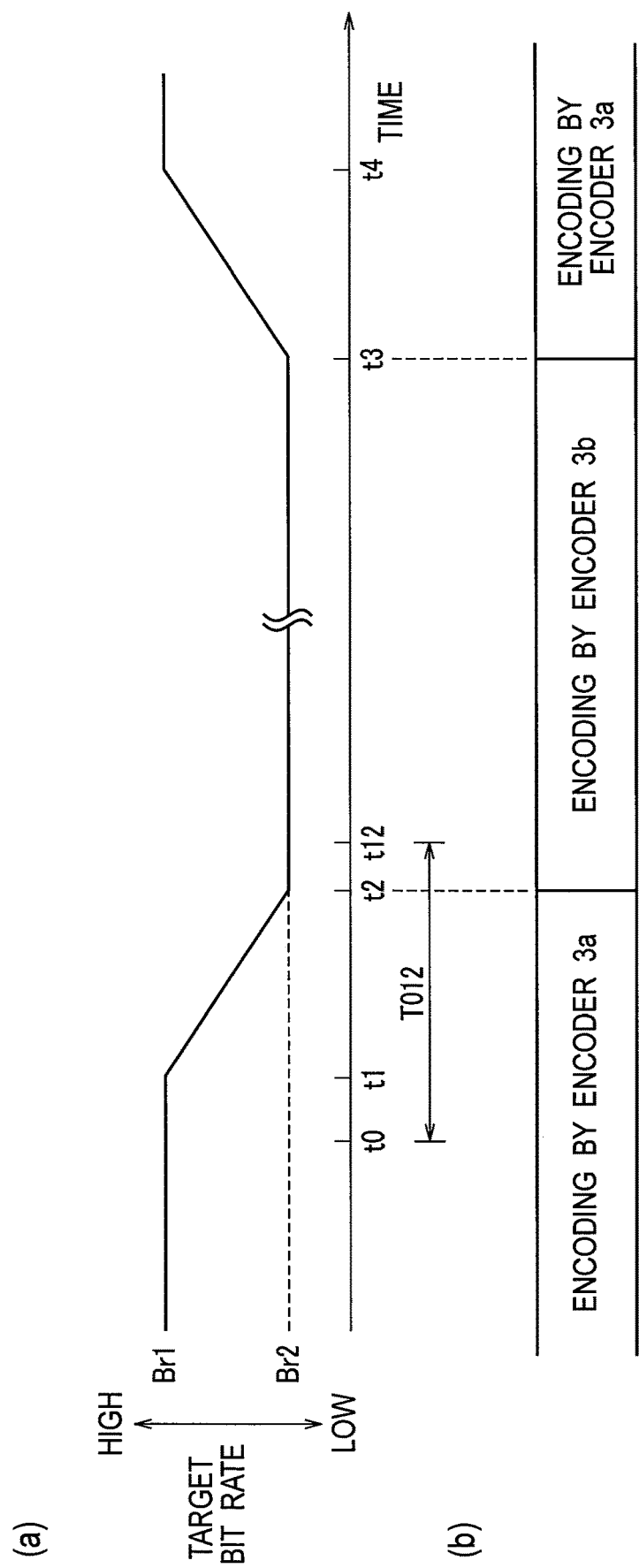
FIG. 7 is a view showing an example of the control of a target bit rate and the switching of a moving image compression mode in an encoder.

It is assumed that, as shown in (a) of FIG. 7, the encoder 3a encodes the moving image data at a target bit rate Br1 until a time t0. At the time t0 shown in (a) of FIG. 7, the failure detector 111 predicts that the real-time transmission will fail after elapse of the time T012 if the target bit rate Br1 continues as it is, and then notifies the encoding controller 112 of this prediction.

The encoding controller 112 controls the encoder 3a to continuously decrease the target bit rate in the encoder 3a from the target bit rate Br1 to a target bit rate Br2, and for example, from a time t1 to a time t2.

The target bit rate Br2 is a bit rate which is lower than the target bit rate Br1, and does not cause the failure of the real-time transmission even in the area Ar2 where the radio field intensity is weak.

When the time T012 is short, the encoding controller 112 may control the encoder 3a to decrease the target bit rate from the time t0. The time t2 just needs to be a time before a time t12 when the vehicle reaches boundary point P12. It is not easy to accurately obtain the time t12, and the obtained time t12 includes an error. Accordingly, it is recommended that the encoding controller 112 control the encoder 3a to change the target bit rate to the target bit rate Br2 at the time t2, which is a predetermined time before the time t12.

The encoding controller 112 controls the encoder 3a to not abruptly decrease the target bit rate in the encoder 3a, but to decrease the target bit rate from the target bit rate Br1 to the target bit rate Br2 within the time T012.

It is recommended that the encoding controller 112 control the encoder 3a to decrease the target bit rate from the target bit rate Br1 to the target bit rate Br2, based on a predetermined rule within the time 1012. For example, it is recommended that the encoding controller 112 control the encoder 3a to decrease the target bit rate continuously or step by step over a predetermined time.

In this way, the encoding bit rate in the encoder 3a does not change abruptly, and accordingly, degradation of image quality is likely not to be conspicuous.

It is assumed that the vehicle further travels and moves to an area where the radio field intensity is strong like the area Ar1. In this case, the encoding controller 112 needs only to control the encoder 3a to increase the target bit rate in the encoder 3a from the target bit rate Br2 to the target bit rate Br1, based on a predetermined rule, and for example, from a time t3 to a time t4.

For example, the encoding controller 112 needs only to control the encoder 3a to increase the target bit rate continuously or step by step over a predetermined time. The time t3 just needs to be a time after the time when the vehicle moves to an area where the radio field intensity is strong.

As an example, when the maximum transmission rate is decreased to an extent as great as ⅕, such that the maximum transmission rate in the area Ar1 is 5 Mbps and that the maximum transmission rate in the area Ar2 is 1 Mbps, then only such a reduction of the target bit rate which is shown in (a) of FIG. 7 is not enough in some cases to avoid the failure of the real-time transmission.

In such a case, as shown in (b) of FIG. 7, the encoding controller 112 may switch the switch 2 to the terminal Tb, and may control the switch 2 and the encoder 3b to encode the moving image data by the encoder 3b, which has a high compression ratio, in place of the encoder 3a.

In (b) of FIG. 7, the encoding controller 112 controls the switch 2 and the encoders 3a and 3b to switch from the encoder 3a to the encoder 3b at the time t2, and to switch from the encoder 3b to the encoder 3a at the time t3.

Timing of switching from the encoder 3a to the encoder 3b needs only to be between the time t0 and the time t12. Timing of switching from the encoder 3b to the encoder 3a needs only to be a time after the time when the vehicle moves to the area where the radio field intensity is strong.

The encoding controller 112 does not control the encoder 3a to execute control of decreasing the target bit rate but may control the switch 2 to execute only the control of switching the encoder, which encodes the moving image data, from the encoder 3a to the encoder 3b.

The encoding controller 112 needs only to avoid the failure of the real-time transmission by any one of the following methods. As a first method, the encoding controller 112 controls the encoder to decrease the target bit rate in a case of encoding the moving image data.

As a second method, the encoding controller 112 controls the switch 2 to switch the encoder, which encodes the moving image data, to the encoder that adopts the moving image compression mode having a higher compression ratio.

As a third method, the encoding controller 112 controls the encoder to decrease the target bit rate, and controls the switch 2 to switch the encoder to the encoder that adopts the moving image compression mode having a higher compression ratio.

In FIG. 1, the number of encoders having different moving image compression modes is two; however, three or more encoders may be provided, and the encoder that encodes the moving image data may be switched among the three or more encoders.

Figure 8:
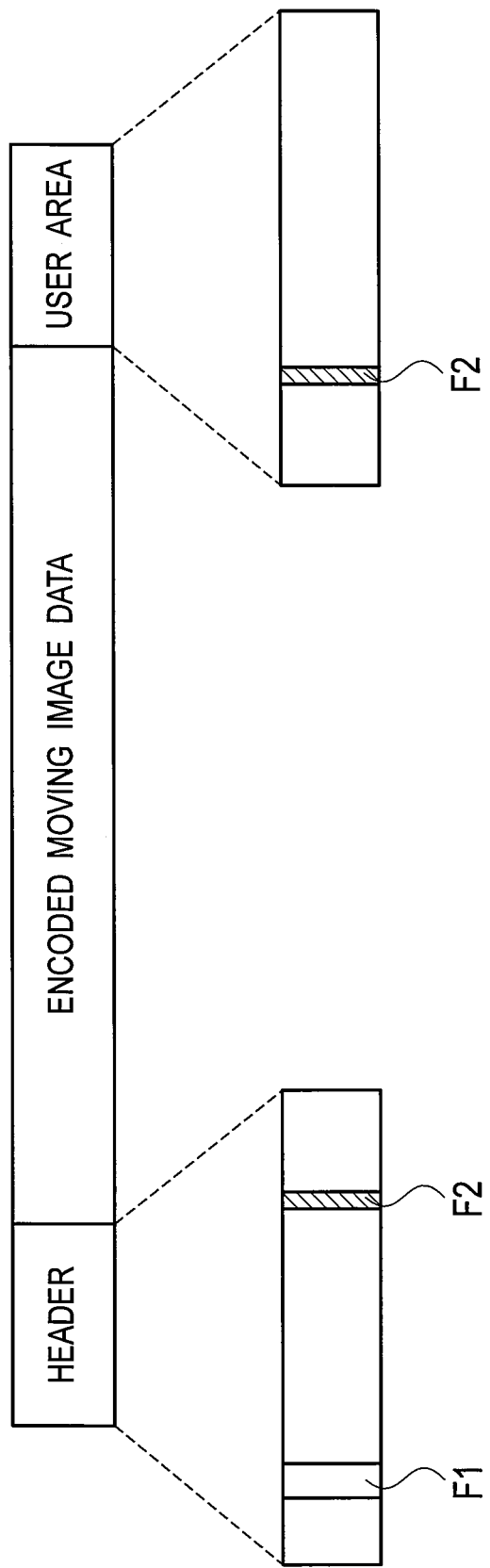
FIG. 8 is a view conceptually showing a bit stream transmitted from the image transmission device shown in FIG. 1 to the image reception device shown in FIG. 2.

The bit stream transmitted from the transmission/reception unit 6 has a format schematically shown in FIG. 8. The bit stream includes a head header, an area of encoded image data which follows the header, and a user area that follows the encoded image data.

The user area may be provided between the header and the area of the encoded image data. Moreover, when there is no information to be stored in the user area, it is not always necessary to provide the user area. When there is a possibility that information to be stored in the user area may exist, a flag for identifying the presence or absence of the user area may be included in the header.

The header includes a flag F1 for identifying a type of the moving image compression mode. When the target bit rate is decreased, for example, a flag F2 indicating that the target bit rate has been decreased is set in the user area. Instead of placing the flag F2 in the user area, the flag F2 may be set in the user area in the header.

Here, when the enhanced encoded data of the enhanced layer is not generated, it is recommended not to set the flag F2. In the following description, it is assumed that the flag F2 is set.

As described above, in accordance with the image transmission device 101 and such an image transmission method executed by the image transmission device 101, a possibility of the failure of the real-time transmission of the encoded data can be reduced. Hence, the image reception device 201 can receive the encoded data necessary to reproduce the moving image in real time, thus making it possible to reproduce the moving image in real time without interruption.

The image transmission device 101 in FIG. 1 may be partially composed of a computer program (an image transmission program). For example, the controller 11 can be composed of a microcomputer, and portions thereof corresponding to the failure detector 111 and the encoding controller 112 can be composed of an image transmission program. The image transmission program may be recorded in a non-transitory recording medium.

The image transmission program causes a computer to execute a step of predicting whether or not the failure of the real-time transmission will occur, and detecting the time until the failure occurs. When it is predicted that the failure will occur, the image transmission program causes the computer to execute a step of controlling the encoder 3a to decrease the target bit rate, within the time T012, when the encoder 3a encodes the moving image data.

Respective portions of the image transmission device 101 may be composed of hardware or software. Choice of hardware and software is arbitrary, and both of them may be mixed. For example, it is also possible to compose the encoders 3a and 3b of the software, and to form the image transmission program by including the encoders 3a and 3b.

Next, the configuration and operations of the image reception device 201 shown in FIG. 2 will be described. In FIG. 2, a variety of operations are performed based on control of a controller 25. The controller 25 may include a flag determination unit 251, a display controller 252, an instruction reception unit 253, and a request signal generator 254.

Here, it is recommended that the controller 25 be composed of a predetermined memory and processor. Moreover, in a similar way, each of the flag determination unit 251, the display controller 252, the instruction reception unit 253, and the request signal generator 254 may be composed of a predetermined memory and processor, or may be configured to share the memory of the controller 25, and to be subjected to control of the processor of the controller 25.

In FIG. 2, a transmission/reception unit 21 receives the transmission signal transmitted from the image transmission device 101. A bit stream acquisition unit 22 acquires the bit stream included in the received signal. The transmission/reception unit 21 includes a transmitter (a transmission circuit) and a receiver (a reception circuit). Moreover, it is recommended that the bit stream acquisition unit 22 be composed of a predetermined memory and processor.

The bit stream acquired by the bit stream acquisition unit 22 is inputted to a decoder 24a, to the flag determination unit 251 in the controller 25, and to a storage unit 23. The decoder 24a decodes the inputted bit stream, and supplies the decoded bit stream to the display controller 252 in the controller 25. The flag determination unit 251 determines whether or not the flag F2 is included in the bit stream. The storage unit 23 stores the bit stream.

It is recommended that the decoders 24a and 24b to be described later be composed of predetermined memories and processors, or the decoders 24a and 24b may be composed of decoding circuits. Moreover, the storage unit 23 may be composed of a storage unit such as a predetermined memory and HDD.

The display controller 252 causes a display 26 to display the decoded moving image data. In this way, the moving image encoded and transmitted by the image transmission device 101 is displayed on the display 26 in real time. Note that the display 26 may be an arbitrary display device.

When the flag determination unit 251 determines that the flag F2 is included in the bit stream, the display controller 252 causes the display 26 to display an image or character information, which indicates that the target bit rate is decreased. By the image or the character information, which is displayed on the display 26, the user can know that the image quality has deteriorated since the target bit rate is decreased.

When the user knows that the image quality has deteriorated as a result of viewing the image or the character information, the user can request the image transmission device 101 to transmit the encoded data corresponding to an amount of codes which are not transmitted during a period while the target bit rate is decreased.

When the user operates the operation unit 27 to input an instruction to request the transmission of the encoded data corresponding to the amount of codes which are not transmitted, the instruction reception unit 253 in the controller 25 instructs the request signal generator 254 to generate a request signal for the image transmission device 101. The request signal generator 254 supplies the request signal to the transmission/reception unit 21. Here, the operation unit 27 may be a predetermined switch or an operation terminal such as a PC (a personal computer).

When adopting the half duplex communication mode, the transmission/reception unit 21 transmits the request signal to the image transmission device 101 at timing when the transmission signal is not received from the image transmission device 101. When adopting the full duplex communication mode, the transmission/reception unit 21 transmits the request signal to the image transmission device 101 at an appropriate timing.

Here, when the user requests the transmission of the encoded data, the transmission/reception unit 21 transmits the request signal to the image transmission device 101; however, the transmission/reception unit 21 may be configured to automatically transmit the request signal to the image transmission device 101 when the flag F2 is included in the bit stream.

That is, as indicated by a broken line, when the flag determination unit 251 determines that the flag F2 is included in the bit stream, the transmission/reception unit 21 may instruct the request signal generator 254 to generate the request signal for the image transmission device 101.

Returning to FIG. 1, when the transmission/reception unit 6 receives the transmission signal from the image reception device 201, the transmission signal including the request signal; the request signal extraction unit 12 extracts the request signal from the reception signal. The request signal extraction unit 12 supplies the request signal to the enhanced information transmission controller 113. Here, it is recommended that the request signal extraction unit 12 be composed of a predetermined memory and processor for temporarily accumulating and analyzing the bit stream.

The enhanced information transmission controller 113 performs control to read out, from the storage unit 5, the encoded data corresponding to the amount of codes which are not transmitted while the target bit rate is decreased, and to supply the readout encoded data to the transmission buffer 4. The encoded data corresponding to the amount of codes which are not transmitted will be referred to as enhanced encoded data.

The enhanced encoded data accumulated in the transmission buffer 4 is transmitted from the transmission/reception unit 6 to the image reception device 201. The transmission/reception unit 6 just needs to transmit the enhanced encoded data to the image reception device 201 when there is a margin for accumulating the enhanced encoded data in the transmission buffer 4, and when there is a margin in the transmission rate.

In FIG. 2, the transmission/reception unit 21 receives a transmission signal of the bit stream including the enhanced encoded data transmitted from the image transmission device 101. The bit stream acquisition unit 22 causes the storage unit 23 to store the enhanced encoded data.

The user operates the operation unit 27 to input an instruction to display the moving image in a period while the target bit rate is decreased with high image quality. The instruction reception unit 253 instructs the storage unit 23 to read out therefrom both of the encoded data in the period while the target bit rate is decreased, and the enhanced encoded data.

The decoder 24a decodes, as a base layer, the encoded data in the period when the target bit rate is decreased. The base layer is supplied to the decoder 24b. The decoder 24b decodes the enhanced encoded data as an enhanced layer. The decoder 24b supplies moving image data, which is obtained by merging both the base layer and the enhanced layer to the display controller 252.

The display controller 252 causes the display 26 to display the moving image data with increased image quality. The display controller 252 may allow the display of a past moving image with increased image quality in place of a moving image transmitted in real time, or may allow the display of a moving image transmitted in real time and a past moving image with increased image quality, for example, on two screens.

In accordance with the transmission/reception system according to the first embodiment, even when the target bit rate is decreased in order to avoid the failure of the real-time transmission, resulting in that the actual encoding bit rate is decreased to deteriorate the image quality, such a moving image on the position where the image quality has deteriorated can be displayed with a high quality.

Respective portions of the image reception device 201 may be composed of hardware or of software. Choice of the hardware and the software is arbitrary, and they may be mixed.

Second Embodiment

Figure 9:
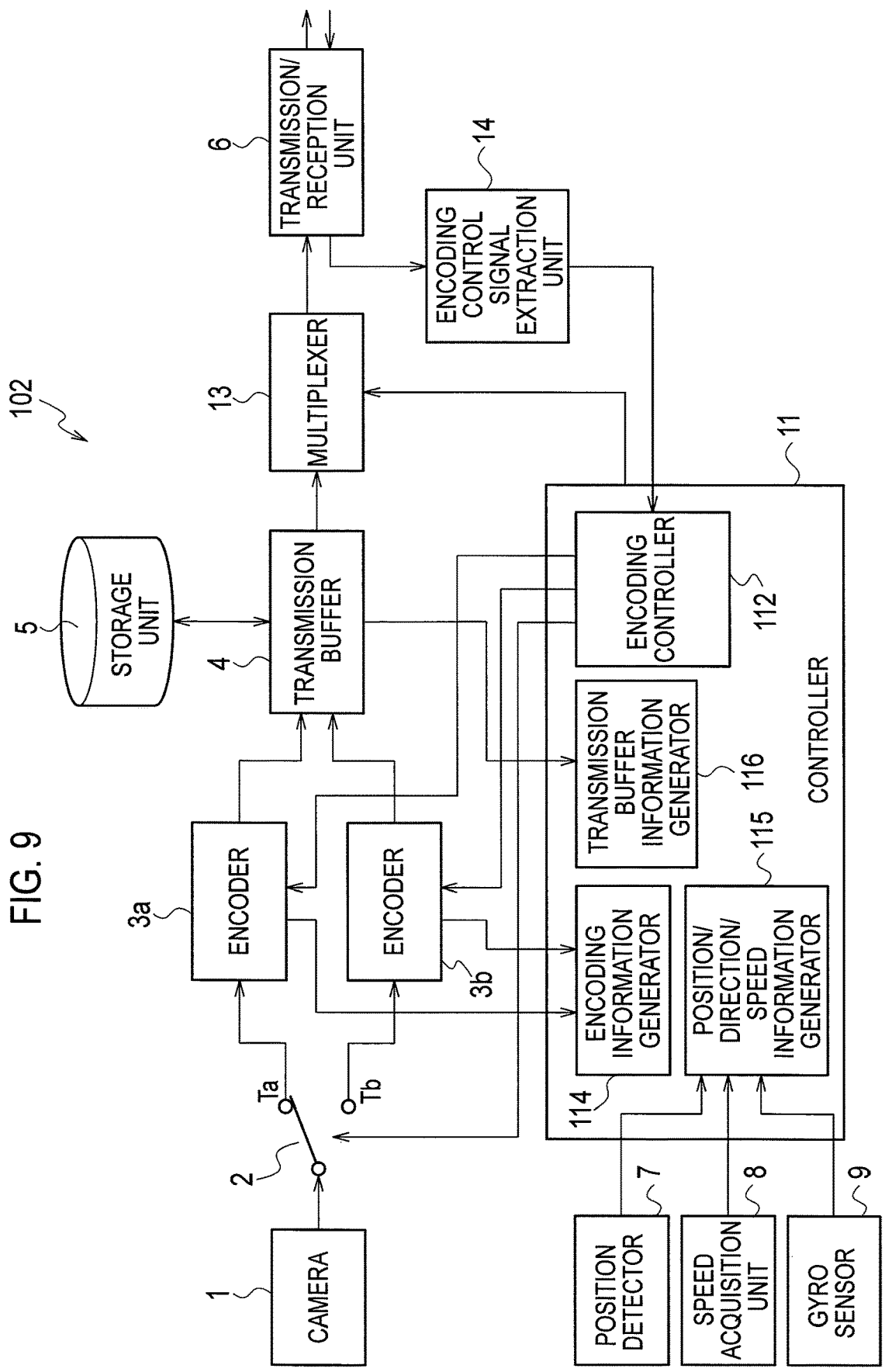
FIG. 9 is a block diagram showing an image transmission device that composes a transmission/reception system according to the second embodiment.
Figure 10:
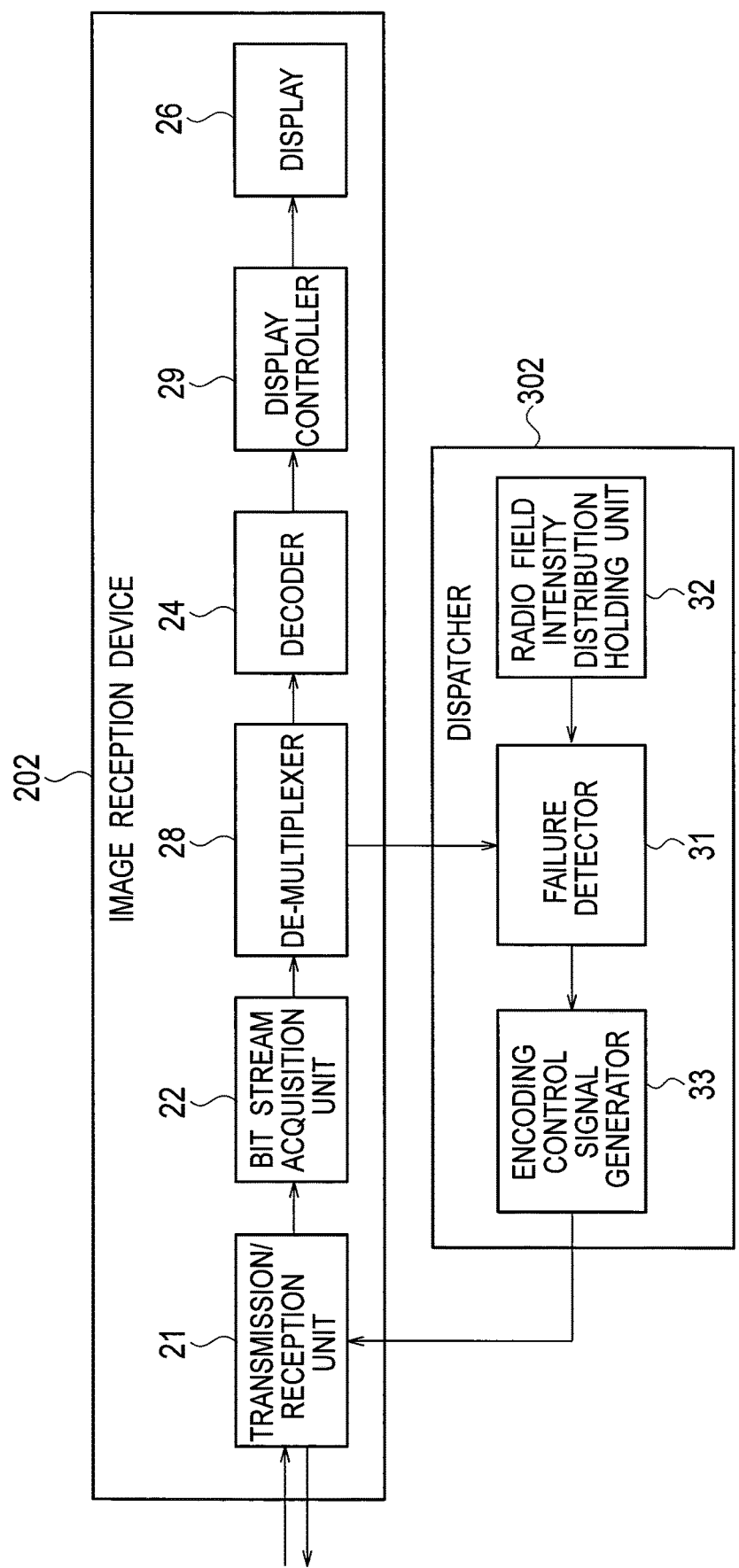
FIG. 10 is a block diagram showing an image reception device and a dispatcher, which compose the transmission/reception system according to the second embodiment.

An image transmission device 102 shown in FIG. 9, and an image reception device 202 and a dispatcher 302 which are shown in FIG. 10, compose the transmission/reception system according to the second embodiment. The dispatcher 302 is connected to the image reception device 202, and controls one or a plurality of image reception device 202.

The dispatcher 302 includes a function of an image transmission control device that controls operations when the image transmission device 102 encodes the moving image data. In FIG. 9 and FIG. 10, the same reference numerals are assigned to the same portions as those in FIG. 1 and FIG. 2, and a description thereof will be omitted in some cases.

A controller 11 in the image transmission device 102 includes an encoding information generator 114, a position/direction/speed information generator 115, and a transmission buffer information generator 116. The image transmission device 102 includes a multiplexer 13 and an encoding control signal extraction unit 14.

Figure 11:
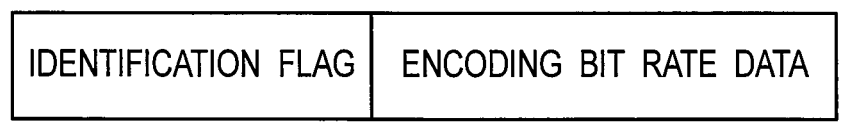
FIG. 11 is a view conceptually showing encoding information transmitted from the image transmission device shown in FIG. 9 to the image reception device shown in FIG. 10.

The encoding information generator 114 generates encoding information indicating an encoding bit rate when the encoder 3a (or 3b) actually encodes the moving image data. As shown in FIG. 11, the encoding information schematically includes an identification flag, which indicates that the encoding information itself is encoding information and the encoding bit rate data. Here, it is recommended that the encoding information generator 114 be composed of a predetermined memory and processor.

Figure 12:
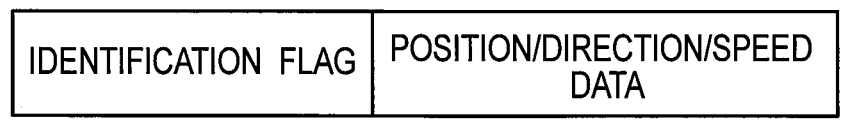
FIG. 12 is a view schematically showing position/direction/speed information transmitted from the image transmission device shown in FIG. 9 to the image reception device shown in FIG. 10.

The position/direction/speed information generator 115 generates position/direction/speed information of the vehicle based on the position information detected by the position detector 7, the traveling speed information acquired by the speed acquisition unit 8, and the direction information of the vehicle which is detected by the gyro sensor 9. As shown in FIG. 12, the position/direction/speed information schematically includes an identification flag, which indicates that this information itself is the position/direction/speed information, and position/direction/speed data. Here, it is recommended that the position/direction/speed information generator 115 be composed of a predetermined memory and processor.

Figure 13:
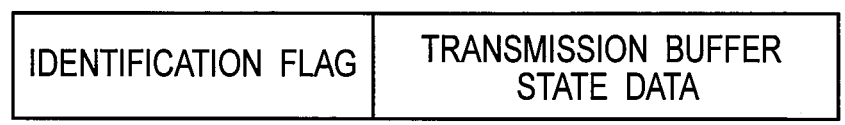
FIG. 13 is a view conceptually showing transmission buffer information transmitted from the image transmission device shown in FIG. 9 to the image reception device shown in FIG. 10.

The transmission buffer information generator 116 generates transmission buffer information based on the state information indicating the accumulation state of the encoded data from the transmission buffer 4. As shown in FIG. 13, the transmission buffer information schematically includes an identification flag, which indicates that the transmission buffer information itself is transmission buffer information and transmission buffer state data. Here, it is recommended that the transmission buffer information generator 116 be composed of a predetermined memory and processor.

Timing of when the encoding information generator 114 generates the encoding information, timing of when the position/direction/speed information generator 115 generates the position/direction/speed information, and timing of when the transmission buffer information generator 116 generates the transmission buffer information do not always have to be the same timing. However, it is recommended that each piece of the information which corresponds to the encoded data to be transmitted be generated at least by the timing of reading out the encoded data to be transmitted from the transmission buffer 4.

The encoding information, the position/direction/speed information, and the transmission buffer information are inputted to the multiplexer 13. The multiplexer 13 performs time division multiplexing for the encoded data, the encoding information, the position/direction/speed information, and the transmission buffer information, which are read out from the transmission buffer 4 and supplies these pieces of data and information which are subjected to the time division multiplexing to the transmission/reception unit 6.

Here it is recommended that the multiplexer 13 be composed of a predetermined memory and processor for multiplexing the above-described respective pieces of data and information as a bit stream, or alternatively, the multiplexer 13 may be composed of a predetermined multiplexing circuit for multiplexing the same.

The transmission/reception unit 6 transmits a transmission signal of the bit stream including the encoded data, the encoding information, the position/direction/speed information and the transmission buffer which are subjected to time division multiplexing to the image reception device 202.

In FIG. 10, the image reception device 202 receives the transmission signal from the image transmission device 102. A de-multiplexer 28 separates the encoded data, the encoding information, the position/direction/speed information, and the transmission buffer information which are included in the bit stream from one another. The encoded data is inputted to a decoder 24, and is decoded therein.

The decoded moving image data is supplied to the display 26 via a display controller 29. The display controller 29 needs only to be similar to the display controller 252, and accordingly, a description thereof is omitted here. Here, it is recommended that the de-multiplexer 28 be composed of a predetermined memory and processor for de-multiplexing the bit stream, or alternatively, the de-multiplexer 28 may be composed of a predetermined de-multiplexing circuit for de-multiplexing the bit stream.

The encoding information, the position/direction/speed information and the transmission buffer information are inputted to a failure detector 31 in the dispatcher 302. In the second embodiment, the image reception device side but not the image transmission device side includes the failure detector.

In FIG. 10, the image reception device 202 and the dispatcher 302 are configured separately from each other; however, they may be configured integrally with each other. The whole of the image reception device 202 and the dispatcher 302 may be defined as an image reception device.

The dispatcher 302 includes the failure detector 31, a radio field intensity distribution information holding unit 32, and an encoding control signal generator 33. The radio field intensity distribution information holding unit 32 holds such radio field intensity distribution information as described with reference to FIG. 4. In such a configuration in which the information indicating the travel route of the vehicle is not transmitted to the image reception device 202, the radio field intensity distribution information holding unit 32 needs only to hold radio field intensity distribution information including the area within a range where it is possible that the vehicle may move.

If the travel route of the vehicle is determined in advance, then in a similar way to FIG. 5, the radio field intensity distribution information holding unit 32 needs only to hold the radio field intensity distribution information at least in a route along which the vehicle moves. Here, it is recommended that the radio field intensity distribution information holding unit 32 be composed of a storage unit such as a predetermined memory and HDD.

In a similar way to the failure detector 111 in FIG. 1, the failure detector 31 predicts whether or not the failure of the real-time transmission by the image transmission device 102 occurs based on the encoding information, the position/direction/speed information, the transmission buffer information, and the radio field intensity distribution information. When the failure detector 31 predicts that the failure of the real-time transmission fails, the failure detector 31 detects the time until the failure occurs. Here, it is recommended that the failure detector 31 be composed of predetermined memory and processor.

When the failure detector 31 predicts that the failure of the real-time transmission occurs, the encoding control signal generator 33 generates a coding control signal for performing the control to decrease the target bit rate in the encoder 3a.

The encoding control signal generator 33 controls the transmission/reception unit 21 to transmit the encoding control signal to the image transmission device 102.

The transmission/reception unit 21 transmits the encoding control signal to the image transmission device 102. When the half duplex communication mode is adopted, the transmission/reception unit 21 needs only to transmit the encoding control signal to the image transmission device 102 at a timing when the image transmission device 102 does not transmit the encoded data. The encoding control signal generator 33 may generate such an encoding control signal for switching the switch 2 so that the moving image data can be encoded by the encoder 3b in place of the encoder 3a. Here, it is recommended that the encoding control signal generator 33 be composed of a predetermined memory and processor.

Returning to FIG. 9, when the transmission/reception unit 6 receives the transmission signal which is transmitted from the image reception device 202 and includes the encoding control signal, then the encoding control signal extraction unit 14 extracts the encoding control signal from the reception signal. The encoding control signal extraction unit 14 supplies the encoding control signal to the encoding controller 112. Here, it is recommended that the encoding control signal extraction unit 14 be composed of a predetermined memory and processor.

In a similar way to (a) and (b) of FIG. 7, the encoding controller 112 controls the target bit rate in the encoder 3a, and according to needs, controls the switch 2 to switch the encoder, which encodes the moving image data, from the encoder 3a to the encoder 3b.

As described above, in accordance with the image transmission control method executed by the image transmission control device provided in the dispatcher 302 and by the dispatcher 302, the possibility of the failure of the real-time transmission of the encoded data can be reduced. Hence, the image reception device 202 can receive the encoded data necessary to reproduce a moving image in real time, thus making it possible to reproduce the moving image in real time without interruption.

Respective portions of the image reception device 202 and the dispatcher 302 may be composed of hardware, or may be composed of software. Choice of the hardware and the software is arbitrary, and both of them may be mixed.

The failure detector 31 and the encoding control signal generator 33 in the dispatcher 302 can be composed of a computer program (an image transmission control program) that causes the computer to execute the above-described processing. The image transmission control program may be recorded in a non-transitory recording medium.

The present invention is not limited to the above-described first or second embodiment, and a variety of modifications can be made without departing from the scope of the present invention. The configuration for displaying with high image quality the moving image at a position with a deteriorated image quality, the configuration being shown in FIG. 1 and FIG. 2, may be omitted. The configuration for displaying, with a high image quality, the moving image at the position with deteriorated image quality may be added to FIG. 9 and FIG. 10.

What is claimed is:

1. An image transmission device comprising:
an encoder configured to encode moving image data and generate encoded moving image data;
a transmission buffer configured to accumulate the encoded moving image data;
a transmitter configured to transmit the encoded moving image data, which is accumulated in the transmission buffer, to an image reception device via a wireless communication line;
a failure detector
based on radio field intensity distribution information of the wireless communication line in a travel route along which a mobile body moves, the travel route being set in advance, on position information, speed information, and direction information of the mobile body moving along the travel route, on an encoding bit rate in the encoder, and on state information indicating an accumulation state of the encoded moving image data in the transmission buffer, configured to predict whether or not a failure of real-time transmission occurs, the failure being a state in which the encoded moving image data is not transmitted from the transmitter to the image reception device in real time, configured to detect a boundary joint between a first area and a second area, the first area including a current position of the mobile body and having a first radio field intensity, and the first area being an area where the failure does not occur, and the second area having a second radio field intensity that is weaker than the first radio field intensity, and the second area being an area where the mobile body will be located if the mobile body moves along the travel route, and where the failure occurs, and configured to detect a time until the failure occurs when the mobile body reaches the boundary point; and an encoding controller configured, when the failure detector predicts that the failure occurs, to control the encoder to decrease, within the time, a target bit rate when the encoder encodes the moving image data, so as to avoid the failure even when the mobile body moves to the second area and becomes the second radio field intensity.

2. The image transmission device according to claim 1, wherein, from a first time before a time when the failure is predicted to occur until a second time after the first time and before the time when the failure is predicted to occur, the encoding controller performs control to decrease the target bit rate when the encoder encodes the moving image data from a first target bit rate to a second target bit rate lower than the first target bit rate based on a predetermined rule.

3. The image transmission device according to claim 1, wherein the encoding controller performs control to switch a moving image compression mode when the encoder encodes the moving image data to a moving image compression mode with a high compression ratio.

4. An image transmission control device comprising:
a failure detector
based on radio field intensity distribution information of the wireless communication line in a travel route along which a mobile body moves, the travel route being set in advance, on position information, speed information, and direction information of the mobile body moving along the travel route, on an encoding bit rate in the encoder, and on state information indicating an accumulation state of the encoded moving image data in the transmission buffer, configured to predict whether or not a failure of real-time transmission occurs, the failure being a state in which the encoded moving image data is not transmitted from the transmitter to the image reception device in real time, configured to detect a boundary point between a first area and a second area, the first area including a current position of the mobile body and having a first radio field intensity, and the first area being an area where the failure does not occur, and the second area having a second radio field intensity that is weaker than the first radio field intensity, and the second area being an area where the mobile body will be located if the mobile body moves along the travel route, and where the failure occurs, and configured to detect a time until the failure occurs when the mobile body reaches the boundary point; and an encoding control signal generator configured, when the failure detector predicts that the failure occurs, to generate an encoding control signal for controlling to decrease, within the time, a target bit rate when the encoder encodes the moving image data, so as to avoid the failure even when the mobile body moves to the second area and becomes the second radio field intensity, and to transmit the generated encoding control signal to the image transmission device.

5. The image transmission control device according to claim 4, wherein, from a first time before a time when the failure is predicted to occur until a second time after the first time and before the time when the failure is predicted to occur, the encoding control signal generator generates an encoding control signal for performing control to decrease the target bit rate when the encoder encodes the moving image data from a first target bit rate to a second target bit rate lower than the first target bit rate based on a predetermined rule.

6. The image transmission control device according to claim 4, wherein
the image transmission control device is provided in a dispatcher that controls the image reception device,
the dispatcher includes a radio field intensity distribution information holding unit that holds the radio field intensity distribution information,
the image reception device receives the position information, the speed information, the direction information, the encoding bit rate and the state information, each of which is transmitted from the image transmission device, and
the failure detector detects the time based on the position information, the speed information, the direction information, the encoding bit rate and the state information, which are received by the image reception device, and based on the radio field intensity distribution information held in the radio field intensity distribution information holding unit.

\* \* \* \* \*